May 18, 1965 M. G. ZAVERTNIK 3,184,256

FLEXIBLE CONDUIT

Filed Jan. 9, 1961

INVENTOR:
MARSHALL G. ZAVERTNIK,
By Kingsland, Rogers & Ezell
ATTORNEYS 3,184,256
FLEXIBLE CONDUIT
Marshall G. Zavertnik, St. Louis, Mo., assignor to Killark Electric Manufacturing Company, St. Louis, Mo., a corporation of Missouri
Filed Jan. 9, 1961, Ser. No. 81,531
5 Claims. (Cl. 285—12)

The present invention relates to a flexible conduit, particularly of the type used to enclose electrical conductors in a hazardous area where any sparking may cause an explosion.

The flexible conduit comprises a flexible conduit or hose, such as a metallic bellows type of conduit, a flexible outer cover, an end fitting by which all of the foregoing parts are sealed together, and the end fitting having thereon an adapter to enable it to be connected to any of various other conduit elements. In addition, the flexible conduit of this invention includes a tubular inner liner of flexible dielectric material such as an impregnated fabric, and the end fitting includes means to provide a liquid sealing type joint connection between the end fitting and the adapter, that also binds in the ends of the inner liner.

An object of the invention is to provide a flexible conduit of this type providing a high degree of interchangeability of components both in the factory and in the field. It is an object therefore to provide such a conduit that can be fabricated from stock end parts, and stock center sections that can be assembled and matched as required to provide all the necessary types of connections.

Another object of the invention is to provide a conduit of this type having a high strength factor and a high degree of sealing, this being obtained through the use of a so-called ball joint type of connection holding the inner liner against the adapter.

Another object of the invention is to provide an assembly of this kind that can be fabricated in such wise that, although certain parts require soldering or welding, such parts can be made in a subassembly prior to the introduction of the inner liner, thereby avoiding burning of the inner liner. A further object is to provide a stronger conduit resulting from the absence of the use of heat in making the final assembly.

Other objects will appear from the description to follow.

Figure 1:
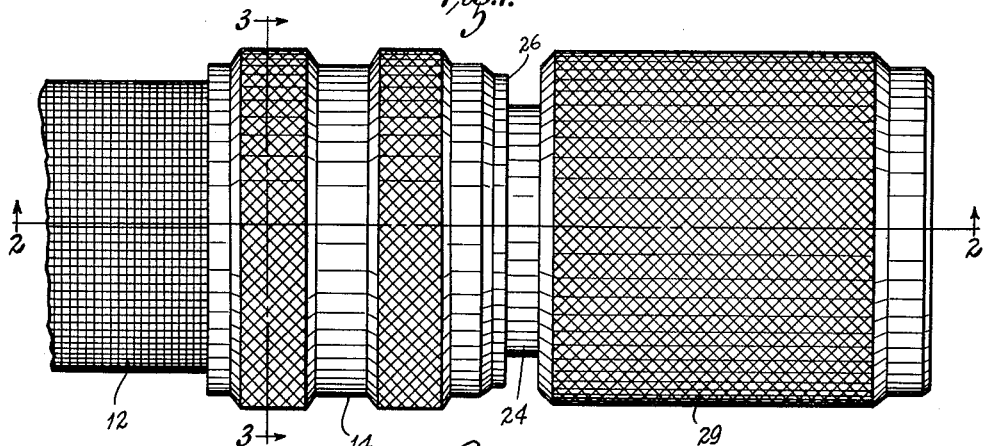
FIGURE 1 is an outside elevation of the conduit with one type of end fittings.

The flexible conduit comprises first a metallic conduit 10 such as the bellows type metallic hose illustrated in the drawing. The flexible conduit 10 is enclosed in a flexible braided cover 12. This cover 12 may consist of braided tubular stainless steel wire or the like.

The foregoing tubular flexible elements are inserted into an end fitting 14. This fitting may have an enlarged diameter 15 at one end, large enough to receive the tubular flexible elements, and may be threaded as shown at 16 at its second end. Between the bore 15 and the threading 16 there is a shoulder 17. This shoulder is adapted to receive and provide a seat for a washer 18 of a particular kind. This washer 18 has a rounded ridge surface 20 adjacent its inner periphery for purpose to be described. While it is preferable to make the washer separate from the end fitting, it could be an integral part thereof.

A first subassembly can be made by inserting the washer 18 against the shoulder 17 of the fitting 14, then inserting the flexible conduit 10 and the protective cover 12 into place in the relative positions illustrated. Thereupon the parts may be soldered together in the area A. The soldering of the flexible conduit 10 to the washer 18, and the soldering of the two conduits 10 and 12 into the enlarged portion 15 of the fitting 14 up to the left end as illustrated at B provides a tight, strong and sealed subassembly that cannot leak from the interior of the conduit 10 to the exterior thereof around the washer 18.

The subassembly has been illustrated with a separate washer 18. This is a preferable construction. Among other things, it permits a greater interchangeability of parts since the same fitting 14 may then be used with different washers 18 to provide different subassemblies or final assemblies. It also enables a different subassembly to be made where desired. The two flexible tubes 10 and 12 may have their ends soldered together and to the washer 18 before these parts are secured to the end fitting 14. Then the assembly into the end fitting can be made.

After the foregoing subassembly is made, which will include conduits 10 and 12 of predetermined length with fittings 14 or the like at the opposite ends, an inner liner may be applied. The inner liner 22 is made of an impregnated fabric that can act as a dielectric and a physical insulator of conductors from the metallic parts of the flexible conduit assembly and particularly from the flexible elements 10 and 12, thereby reducing the hazard of sparking and also of injury to the insulation of the conductors. The ends of the inner liner 22 are flared out around the rounded ridge 20 of the washer 18. Thereupon an adapter 24, having external threads, is threaded into the threads 16 of the fitting 14. The adapter has a curved recess 25 that is adapted to complement the curved ridge 20 and to receive the inner liner 22 and to clamp it between the abutting surfaces of the recess 25 and the ridge 20. This secures the inner liner at its ends firmly into place, without injury to it. Furthermore, this eliminates loose ends on the inner liner that might become frayed and subject to undue wear. This coupling can be assembled very readily so that the inner liner can be cut from a longer source to suit any particular installation, or it may be cut into lengths appropriate to the stock lengths of the other elements 10 and 12.

The interfitting ridge 20 and groove 25 are illustrated as rounded. Under some conditions these may have other inter-related shapes, such as a more conical one. When the inner liner is omitted, a seal may be made by tightening the ridge and groove together directly. Such an arrangement may be used when the conduit is used to carry liquids.

After the adapter 24 is threaded into place and the inner liner 22 is firmly secured about the ridge 20, the adapter may be staked into place in the end fitting to prevent relative movement between them; or the end rim 26 of the fitting 14 may be peened over to prevent relative movement of the elements 14 and 24.

Figure 2:
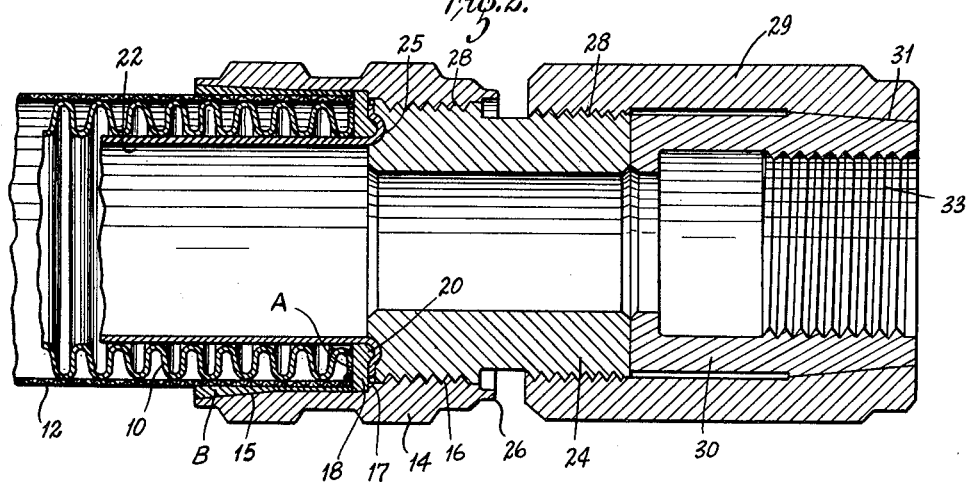
FIGURE 2 is a diammetrical section taken on the line 2—2 of FIGURE 1.
Figure 3:
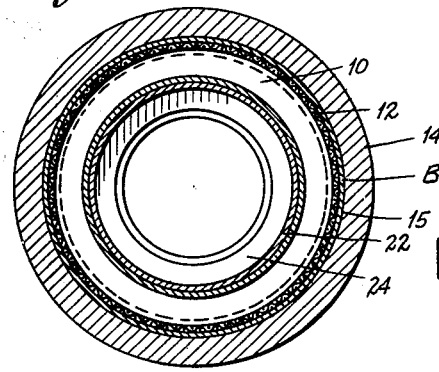
FIGURE 3 is a transverse section taken on the line 3—3 of FIGURE 1.
Figure 4:
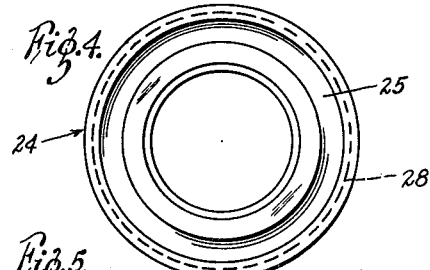
FIGURE 4 is a left-end view of the adapter.
Figure 5:
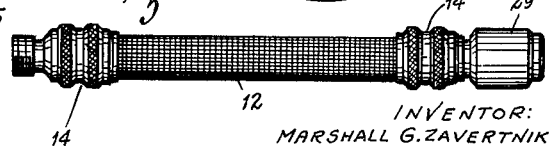
FIGURE 5 is an elevation, in reduced scale, of a complete coupling with a male fitting at one end and a female fitting at the other.

The adapter 24 is illustrated as having external threads 28 at its free ends. The function of these threads is to constitute a universal attaching means to enable any one of a number of different connectors to be attached to the flexible conduit. As illustrated in FIGURES 1–4, the adapter receives a type of female nipple, comprising a threaded coupling element 29 employed to connect an internally threaded element 30 to constitute a wedged female union. As shown, there are tapered and wedging inner surfaces 31 between the connectors 29 and 30. Hence, tightening of the threads 28 tightens the engagement of the surfaces 31, forces the end abutting surface of the element 30 into close bonding against the end of the adapter 24, and restrains relative movements between the parts. It will be understood that other ends such as male and female nipples, elbows, or the like, can be attached to the adapter.

With the present flexible conduit there is no electrical isolation of any parts thereof. The elements 10 and 12 are connected together electrically and are also connected to the fitting 14 electrically by the solder. The elements 14 and 24 are electrically connected together through the threads 16. Similar threaded surfaces and the wedged surfaces 31 insure that there will be electrical conductivity from the adapter 24 through the right end fitting parts 29. Ultimately the additional internal threads 33 insure electrical conduction to any additional conduits or the like that are connected to this fitting.

This coupling greatly simplifies the inventory requirements of sellers and users of such couplings. In the first place, the assembly of this coupling is simpler than that of prior couplings. Also the basic coupling can be readily adapted to a large number of different end connections, thus eliminating the necessity of stocking fittings of different end connections for a wide variety of sizes.

Various changes and modifications may be made within the process of this invention as will be readily apparent to those skilled in the art. Such changes and modifications are within the scope and teaching of this invention as defined by the claims appended hereto.

What is claimed is:

1. A flexible conduit device: comprising a metallic, impermeable, flexible tubular conduit, and a flexible metallic, tubular enclosing element around the conduit; a tubular end fitting at each end, each fitting having a bore in its first end larger than the enclosing element and terminating in a shoulder; a flange-like member disposed adjacent to said shoulder and extending radially inwardly from the entire periphery of said enclosing element and projecting across the ends of the conduit and enclosing element, for attachment thereto, and adapted to be fitted into the bore of the end fitting with its outer portion engaging against the shoulder, and having its inner portion of smaller diameter than the shoulder whereby the member extends inwardly of the walls of the fitting to present exposed faces toward both ends of the fitting, sealing means between the flexible conduit, the enclosing element, the flangelike member, and the walls of the bore of each end fitting; tubular adapters, means securing the first end of one adapter into the second end of each end fitting, the said end of the adapter having an end portion of a diameter to be engageable with the flange-like member, each adapter having attaching means on its second end for attachment to any one of a plurality of other fittings having complementary attaching means at their one end, and having various different attaching devices at their other end; and a selected one of such other fittings attached by said attaching means to each adapter.

2. The conduit device of claim 1 wherein the flangelike member consists of a washer, the same being attached to the fitting by the sealing means.

3. The conduit device of claim 1, wherein there is an inner tubular lining of flexible dielectric material, with its end clamped between the washer and the adapter.

4. The conduit device of claim 1 wherein there is a flexible, tubular heat-sensitive liner inside the flexible conduit, its end projecting therefrom and being flared across the outer face of the shoulder, and clamped thereagainst by the said other fitting.

5. The conduit device of claim 4 wherein the outer face of the shoulder and the related end of the said other fitting have complementary circular ridge and groove formations therein.

References Cited by the Examiner
UNITED STATES PATENTS

| | | | |
|---|---|---|---|
| 771,682 | 10/04 | Sussman | 285—331 |
| 909,959 | 1/09 | Stoddard | 258—334.1 |
| 2,240,413 | 4/41 | Parker | 285—287 |
| 2,323,912 | 7/43 | Johnson | 285—348 |
| 2,357,669 | 9/44 | Lake | 285—149 |
| 2,613,958 | 10/52 | Richardson | 285—55 |
| 2,678,836 | 5/54 | Courtot | 285—149 |
| 2,848,254 | 8/58 | Millar | 285—149 |
| 2,934,095 | 4/60 | Lockhart | 285—55 |
| 2,998,984 | 9/61 | Gressel | 285—55 |

CARL W. TOMLIN, *Primary Examiner.*

HUNTER C. BOURNE, JR., *Examiner.*